United States Patent

[11] 3,593,370

| [72] | Inventor | James M. Lapeyre<br>13 Richmond Place, New Orleans, La.<br>70115 |
|---|---|---|
| [21] | Appl. No. | 859,408 |
| [22] | Filed | Sept. 19, 1969 |
| [45] | Patented | July 20, 1971 |

[54] METHOD OF BUTCHERING TUNA
10 Claims, 9 Drawing Figs.

[52] U.S. Cl. .................................................... 17/52,
99/111, 146/241
[51] Int. Cl. ..................................................... A22c 25/14,
A22c 25/18
[50] Field of Search .......................................... 17/52, 61,
54, 58; 99/111, 188; 146/241

[56] References Cited
UNITED STATES PATENTS

| 1,807,448 | 5/1931 | Soderberg | 17/61 |
| 2,421,262 | 5/1947 | Hellden | 17/61 |
| 2,541,442 | 2/1951 | Skoog | 17/61 |
| 2,565,727 | 8/1951 | Henderson | 17/54 |
| 2,911,668 | 11/1959 | Johnson | 17/58 X |
| 3,152,912 | 10/1964 | Carruthers | 99/111 |

*Primary Examiner*—Lucie H. Laudenslager
*Attorney*—Wilkinson, Mawhinney & Theibault

ABSTRACT: Method of butchering frozen whole fish including the subdivision of the whole fish into a plurality of cross sections thereof and subsequently subdividing the cross sections into frozen segments the junctures between which are along lines which are general parallel to the longitudinal axis of the fish and to the skeletal structure thereof.

PATENTED JUL20 1971  3,593,370

INVENTOR.
JAMES M. LAPEYRE

BY
Wilkinson, Mawhinney & Theibault
ATTORNEYS

INVENTOR.
JAMES M. LAPEYRE

METHOD OF BUTCHERING TUNA

This invention relates to the commercial butchering of frozen tuna, and more particularly to a novel method for removing the major portions of skin, bones, dark meat, viscera, and other parts from tuna flesh while the latter is in a frozen or substantially frozen condition to provide cleaned tuna meat suitable for subsequent commercial processing and packing, such as by canning or packaging frozen.

Tuna comprises one of the world's leading fishery resources and such are widely distributed in temperate, semitropical and tropical waters. Insofar as United States landings are concerned, the Pacific coast catch conventionally includes albacore (germo alalunga), bluefin (thunnus thynnus), skipjack (katsuwonus pelamis), and yellowfin (neothunnus macropterus). The Atlantic coast catch, which is quite small as compared to the Pacific coast catch, conventionally includes bluefin and little tuna (ethynnus alletteratus). The above-recognized species of tuna vary widely in size with albacore ("white meat" tuna) having a maximum weight of about 80 pounds and with the usual commercial catch weighing less than 40 pounds and averaging from about 12 to 25 pounds; Pacific bluefin having a maximum weight of about 250 pounds and with the usual commercial catch averaging from about 20 to 40 pounds; skipjack having a maximum weight of about 40 pounds and with the usual commercial catch averaging from about 4 to 20 pounds, and yellowfin with a maximum weight of about 400 pounds and with the commercial catch averaging about 30 to 40 pounds. In contradistinction therewith, the Atlantic bluefin can reach a maximum weight of about 1,500 pounds or more and the commercial catches average either between 8 to 65 pounds or from 65 pounds up to 600 pounds, and the little tuna has a maximum weight of about 20 pounds and a commercial catch averaging between 5 and 10 pounds. In addition to the above five recognized species of tuna, two additional species of "tunalike" fish are processed commercially (canned tuna style) although, when canned, they cannot be domestically labeled as "tuna." These additional species include both the Atlantic and Pacific species of bonito (sarda sarda and sarda chiliensis, respectively) and the yellowtail (seriola dorsalis). THe Pacific bonito has a maximum weight of about 25 pounds, about twice that of the Atlantic species, and the commercial catch thereof usually averages from 6 to 8 pounds, while the yellowtail has a maximum size of about 80 pounds with the commercial catch averaging somewhat less than 15 pounds.

For the purpose of this application the term "tuna" will, because of the conventional commonality within the industry, be considered to specifically include only the above described seven species of fish.

For the purposes of comparison and for more distinctly pointing out the nature of this invention, the immediately following portions of this specification will generally delineate the nature of the essential butchering and cleaning operations that have been conventionally employed by the tuna canning industry which presently butchers and cleans the preponderance of the frozen tuna landed.

The majority of the tuna catch conventionally arrives at a cannery in a frozen or partly thawed—partly frozen condition and is initially subjected to a thawing operation preparatory to butchering. Immersion in water, water spraying or air-current exposure are commonly employed techniques to hasten thawing. Since, however, the delivered tuna are not only quite disparate and nonuniform as to size, but also may vary in condition from hard frozen to (when thawing is begun aboard ship during the return voyage) completely thawed. Requisite thawing times under present day practices vary widely and introduce problems both with respect to the size of thawing areas and facilities that are required and to the efficient scheduling of operations subsequent thereto. Thawing times of up to 12 hours or more are not unusual. Thawing of the fish is progressive and smaller tuna and exterior parts of larger tuna reach the desired state of thaw while the inner parts of the larger tuna are still frozen. Deterioration of unfrozen tuna, especially whole uneviscerated tuna, is rapid at temperatures sufficient to hasten thawing. The quality of the unfrozen tuna diminishes with time, and the first thawed whole tuna and outer portions of other tuna begin to diminish in quality before the last thawed portions have become unfrozen.

Once, thawed, the tuna are tabled and individually hand manipulated and butchered by longitudinally slitting the belly to permit removal of the visceral organs, after which the visceral cavity is thoroughly washed out with water and the tuna inspected for spoilage. It is my understanding that, in some instances, tuna are eviscerated aboard ship prior to freezing, in which cases, of course, the in-plant evisceration procedure is unnecessary.

It is important to note that the above slitting and evisceration procedure is the only butchering operation performed on the tuna while it is in the raw condition. As will be explained presently, all other cleaning is performed after the tuna has been cooked.

Following evisceration operation, the tuna is placed in precooking baskets or racks. While basketed or racked, the tuna are subjected to a batch-type precooking operation which effects a sufficient denaturing of the tissues holding the loins to the bony and cartilaginous material, that generally comprises the skeletal structure, to permit the loins to be readily separated therefrom by subsequent manual operations. Such precooking involves exposure of batches of eviscerated whole tuna to temperatures in the order of 212°-220° F. for a sufficient period of time to effect the requisite tissue denaturing in the vicinity of the spinal formations adjacent the longitudinal center of the tuna. Although a size grading of the tuna is oftentimes effected in forming the individual batches in an effort to achieve optimum cooking times therefore, a variation in size of tuna is usually still present with a concomitant unavoidable variation in the degree of cook within the tuna. In addition, the time of the "precook" for individual batches varies widely due to the inevitable disparate sizes of tuna involved. For example, the cooking time may vary from 1 1/2 hours for very small tuna up to 8 to 10 hours or more for larger tuna.

Apart from the excessive time periods involved and consequent inherently inefficient utilization of cooking facilities, which include large walk-in steam-heated steel pressure chambers, the uneven or compromise nature of the cooking operation results in nonuniform cooking and can often result in both undercooking and overcooking of tuna cooked in the same batch, as well as undercooking and overcooking of portions of the individual tuna. Undercooking renders subsequent separation of the loins from the skeletal structures more difficult, with a consequent increase in cleaning expense and loss of valuable product. Overcooking in contradistinction therewith, results in excessive weight loss due to undue loss of natural oils, juices and moisture and often times is accompanied by a deleterious color transferral from the less valuable blood meat portions into the more desirable adjacent light meat portions of the loins, with a consequent diminution in product value.

Following the precook under present day practices, the precooked tuna must, because of its friable and fragile nature while warm, be cooled thoroughly to firm up the flesh before the manual cleaning operation can be performed. Cooling also reduces the temperature to a level which is comfortable to the touch so as to permit manual cleaning with a minimum of wasted motion. The cooking time required will vary widely both in accord with the nature of the cooling facilities employed and the size of the tuna. Cooling periods can vary in amount from a few hours up to 12 or 16 hours or even more and during which time the tuna are subject to the deleterious exposure to air and enzyme action.

Even more important than the above, from an economic standpoint, are the weight losses attributable to uncontrollable shrinkage that inherently results from the above described conventionally employed precooking and cooling operations.

According to a Special Scientific Report: Fisheries No. 104 of the Fish and Wildlife Service of the United States Department of the Interior, shrinkage in amounts of up to 30 percent of the weight of the tuna takes place during the precooking and cooling operations, with two-thirds to three-fourths thereof taking place during the cooking as distinguished from the cooling operation. Such shrinkage is effectively caused by loss of oils, solids, dissolved protein and other tissue constituents and moisture during cooking and by loss of moisture due to evaporation and drip during cooling. Some reduction in weight of the raw tuna is inherent and necessary, but uncontrolled loss is wasteful and costly. Since the cost of the basic raw tuna represents about 70 percent of the processor's cost, it has been long recognized that any savings that could be effected in the shrinkage that inherently accompanies the precooking and cooling operation would be of the greatest importance. The distinct and serious disadvantages above noted which flow from the inherently uneven and nonuniform nature of the required precooking and associated cooling and antecedent operations have long been recognized and suggested avoidance thereof through efforts represented, for example by Borg U.S. Pat. No. 2,411,188; Stevenson et al. U.S. Pat. No. 2,635,050; Berglund U.S. Pat. Nos. 2,534,219 and 2,612,652; and the Anderson-Jann-Carruthers U.S. Pat. Nos. 2,954,298 and 3,152,912 have not been commercially accepted to any appreciable extent and the basic problems are still extant.

Subsequent to the above-described precooking and cooling operations, the whole cooked and cooled tuna are routed to tables and there are individually manually manipulated and cleaned. Conventionally, in the cleaning of the cooked tuna, the head and tail are removed by breaking off of the same, and the skin and fins are manually scraped off, after which the tuna is manually split lengthwise and the backbone removed. Each half is split again longitudinally to form a pair of discrete dorsal loins, i.e., the right and left epaxial muscles, and a pair of discrete ventral loins, i.e., the right and left hypaxial muscles. The blood and associated dark meat portions are then scraped away and the loins, edible flakes and waste products are selectively routed to separate processing stations for further operations thereon. It should be noted that, in present day cleaning practices, the precooking to which the tuna is subjected is a processing step designed to ease the manual cleaning operations since after being precooked the tuna "comes apart" very easily. As noted above, manual labor is conventionally employed for the above-described cleaning step and the rate at which tuna can be cleaned varies with both the skill of the worker and with the size of the tuna being handled. The costs involved and the essentially tedious and disorderly nature of the cleaning operation have created a recognized and longstanding need for mechanization of the cleaning step. However, the disparate sizes of the whole tuna being processed and the inherent longitudinal dissymmetry of anatomy of same, coupled with the friable nature of the cooked tuna, have been material factors contributing to the awareness of the industry that the problems faced were not easy of solution and to the inability of the industry, despite widespread effort, to solve the same.

Following the cleaning operation, the separated longitudinal loins, which resemble the shape of french bread loaves, are subjected to a guillotine-type shearing operation across the grain of the cooked loin to form can depth segments thereof for a solid pack or to form smaller segments for a chunk pack thereof, both of which are attended by undesired fragmenting of the loin meat at the locus of the cut. After such cross grain cutting, the segments of tuna are either hand or machine packed into cans. The fragments are separately packed, and demand a much lower price on the market.

It should be noted from the foregoing that the in-plant processing time, from the commencement of the thawing operation to the final can-filling operation, can be as much as 38 hours, and even this period is frequently exceeded by some processors. The bulk of this time period, is devoted to thawing, cooking and cooling operations. The sole reason for cooking the tuna prior to cleaning same is to facilitate manual cleaning of the fish. In spite of the fact that an upgrading of the canned product can be attained when tuna meat is uniformly cooked after cleaning, the industry has continued the above-outlined processing procedure for approximately 50 years.

Unlike the above explained practice of skinning and cleaning the fish after performing thawing and cooking operations, the subject application will teach skinning and cleaning of the edible portions of the tuna while the latter remain in the original frozen or substantially frozen condition which was effected upon the fresh tuna at sea. The sometime practice of beginning the thawing operation on board the returning fishing vessel should be discontinued if the benefits of the subject invention are to be fully realized. Such discontinuance will also serve to simplify shipboard operations.

With a view to clarity, it should be said that conventional butchering and cleaning practices ignore the physical properties of frozen tuna. In contradistinction to conventional practices, the subject invention takes advantage of certain physical properties of frozen tuna and/or parts thereof which properties exist only while the tuna is in a frozen state.

Frozen tuna flesh has good mechanical strength in compression. Whereas it does not become as hard as ice formed from pure water at conventional freezer temperatures, it loses its natural supple and deformable gelatinous quality, and becomes hard enough to readily withstand, without damage, those compressive loads as may necessarily be imposed upon it during mechanical handling and/or working of the tuna or parts thereof. Consequently, frozen whole tuna or parts thereof may be handled, for mechanical purposes, much like soft wood. The natural flesh grain or directional alignment of the edible muscle fibers is generally parallel to the longitudinal axis and backbone of the fish. Frozen tuna flesh, somewhat like wood has relatively weak resistance to cleavage parallel to its natural grain and along certain planes or junctures. This is especially true at the vertical junctures of the right and left epaxial and hypaxial muscles with the vertical skeletal structure, and the horizontal junctures of the epaxial and hypaxial muscles with the horizontal skeletal structure.

The condition of being frozen makes it possible to perform with ease mechanical operations on tuna which would be difficult or impossible if attempted on unfrozen or cooked tuna. Frozen whole tuna and/or parts thereof may be sawed, drilled, routed, carved, die-cut, broached, scraped, cleaved and longitudinally split, without diminishing the quality of unworked portions of frozen flesh.

After the conventionally practiced cooking of the unskinned fish, the skin of the tuna becomes soft and weak in strength, and is easily torn or fragmented. It is readily rubbed and/or scraped free of the cooked fish by hand with the aid of simple knives or hand scrapers. The conventional practice in the industry of hand skinning after cooking is therefore facilitated by the standard precooking operation. However, damage and wastage of the delicate and friable flesh underlying the skin of the cooked fish is, due to the manual scraping off of the skin, severe and much of the otherwise perfect loin meat is degraded to fragments or lost to scrap during the conventional skin-scraping operation.

In contradistinction, the practice of the subject invention includes the removal of the skin while the edible flesh is in a substantially frozen condition.

In it's natural state, unlike the cooked state, tuna skin is tough and pliable and has good resistance to tearing due to a network of strong fibers with which it is reinforced. Freezing of the skin does not substantially weaken or diminish the toughness or tear strength of the skin but while frozen it is substantially rigid and hard, and it may be removed while in the frozen condition by sanding or rasping. It thaws quickly however, when exposed to tap water or ambient air at room temperature, and after thawing to the point of pliability it can be pulled or peeled away from the underlying flesh which if maintained at least in a partially frozen state will remain substantially intact. The skin therefore may be removed in either the frozen condition by sanding or rasping and the like, or it may be removed after at least a partial thawing operation. The latter is preferred since the partial thawing is simply effected and since the apparatus required for pulling or peeling off of the skin from a frozen section, is of the simplest kind such as a pair of hand held pliers.

During the shipboard freezing of the whole tuna, the contents of the abdominal or visceral cavity become substantially solidified. Rather than thaw the fish as is the conventional practice, prior to opening the visceral cavity by longitudinally slitting same, it is far more expeditious to crosscut the tuna into sections and remove the viscera from one end of each of the cut sections. In this manner, the possibility of spoilage of the fish, due to thawing, is eliminated. The viscera, if kept frozen, may be stored for separate processing or disposal without the possibility of it becoming unpleasantly odorous.

When viewed in cross section, it will be noted that the interior parts of the fish (except for the contents of the visceral cavity) are symmetrical about a vertical plane hyperthetically passed through the backbone which is at, approximately, the geometrical center of the fish. In addition to taking advantage of the physical properties of the tuna while it is frozen, the present invention, as will be shown, makes use of this fact of bilateral symmetry within the fish.

In its broader aspects, the subject invention may be briefly described as a novel method for the commercial butchering of tuna while frozen, which includes subdividing the principal loin-bearing portions of the tuna generally transverse to the longitudinal axis and the natural flesh grain thereof into a plurality of discrete bilaterally symmetrical frozen sections having a predetermined thickness and thereafter skinning said sections and longitudinally cleaving and/or cutting said sections to effect separation of the scrap parts of the sections from the loin parts while the latter are in a substantially frozen condition.

In a more narrow aspect, the subject invention includes removal of the skin from the frozen sections of tuna by subjecting the skin to at least a partial thaw so as to render it pliable and thereafter pulling or peeling off the skin from the section while the latter remains in a substantially frozen condition.

In an even more narrow aspect, the subject invention includes the additional processing steps of grading, as by sorting and routing, similarly sized and/or anatomically configured and laterally symmetrical frozen sections into predetermined groupings thereof to permit both uniformity and automation of the aforesaid skinning, cleaving and/or cutting operations.

In a still narrower aspect, the invention includes the removal of the contents of the visceral cavity while maintaining the edible tuna flesh in a substantially frozen condition.

An important advantage attendant to the practice of the subject invention is the permitted maintenance of the sea frozen condition, throughout the butchering and cleaning operations, so as to maintain the highest possible quality in the fish until the same is eventually cooked or packaged frozen.

Another important advantage is a permitted flexibility in commercial tuna product production, in that practice of the invention permits the packer to produce either or both canned tuna and frozen raw tuna products, such as frozen steaks and the like, from the same supply of whole fish. Other advantages include a substantial reduction in the amount of hand labor required to butcher tuna, a substantial reduction in processing time by the elimination of the need to thaw whole fish, a marked reduction in the physical effort required of the workers due to the reduction in size of the work pieces being handled.

Other objects of the invention include the provision of improved handling techniques for frozen tuna and methods for the realization of the advantages set forth above and such, together with further objects and advantages, will become more apparent from the following portions of this specification which sets forth, in conjunction with the attached illustrative drawings, certain presently preferred operational techniques incorporating the principles of the invention in the commercial butchering of frozen tuna for the commercial packing thereof.

With the foregoing and other objects in view, the invention will be more fully described hereinafter, and will be more particularly pointed out in the claims appended hereto.

In the drawings, wherein like symbols refer to like or corresponding parts throughout the several views.

Tuna, frozen at sea, is received whole at processing plants in frozen, or substantially frozen condition. In accordance with the principles of this invention, the received frozen tuna, after desirably being subjected to a preliminary grading or sorting as to size and species, is initially subdivided into a plurality of discrete lateral sections; as for examples, sections numbered 1 through 9 of FIG. 1, by cutting the loin bearing portions thereof generally transverse to the longitudinal spine or backbone, as represented in 146 of FIGS. 2 through 7. Preferably, such lateral sections are of uniform thickness, at least over the extent of the main body of the tuna, and are longitudinally dimensioned so as to be ultimately complemental to the type of pack for which the tuna is intended. Such operation can be readily effected by a variety of manual, semiautomatic, or automatic sawing or cutting equipment.

The subdivision step not only permits immediate removal of head portions (112 and 112a) and tail portions (114) for separate processing, either immediate or future, but also serves to convert the whole tuna into discrete ready handleable, manipulatable and sortable segments that are of convenient size and shape and, due to their frozen condition, having physical properties, as outlined above, to facilitate subsequent processing steps and operations.

Figure 1:
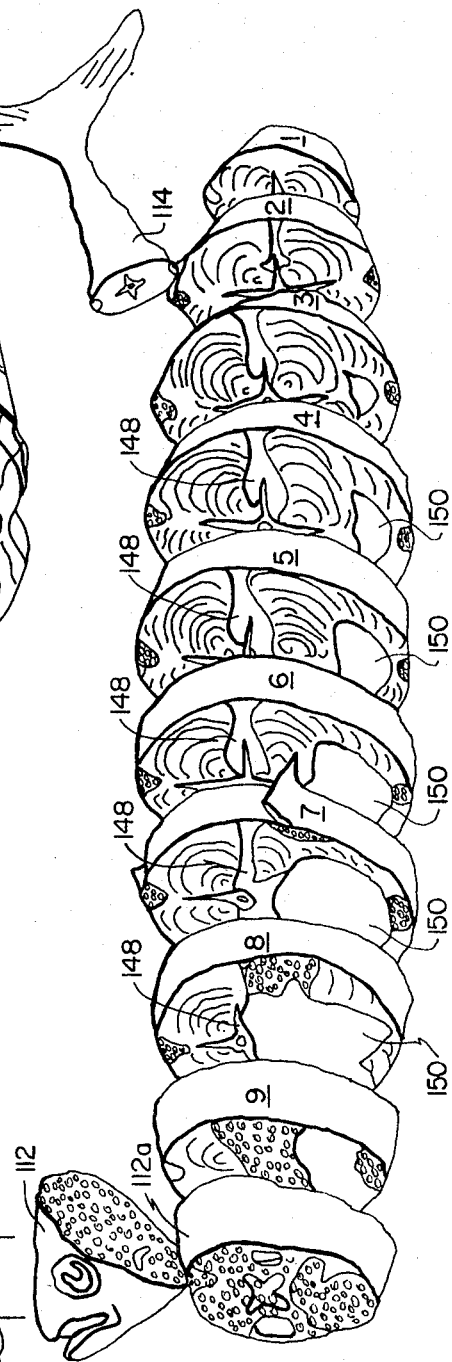
FIG. 1 is a perspective view of a tuna which has been subdivided into a plurality of cross sections.
Figure 4:
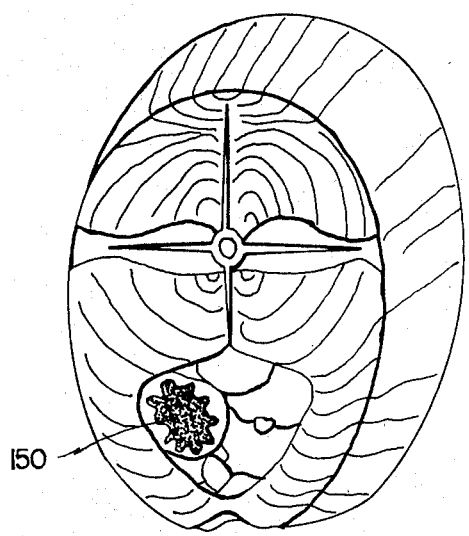
FIG. 4 is a perspective view of the section after it has been skinned.
Figure 5:
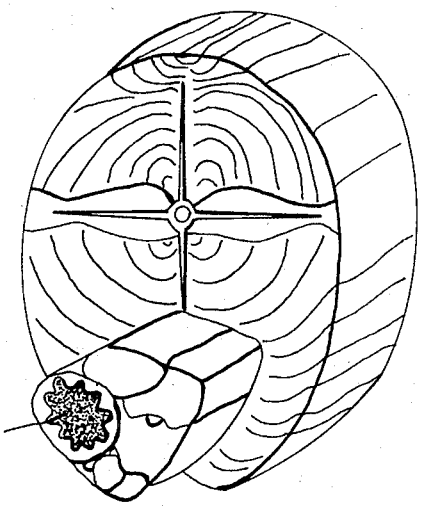
FIG. 5 is a perspective view of the same section showing the plug of viscera partially removed from the section.
Figure 6:
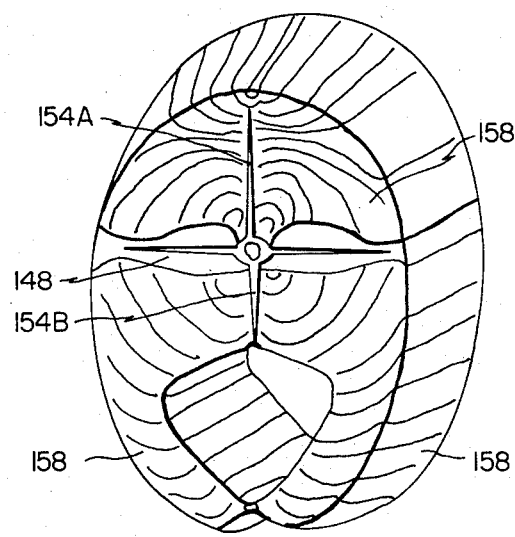
FIG. 6 is a perspective view of the same section after the viscera has been removed.

It is apparent from FIG. 1, that while all of the sections are generally oval shape and all of approximately uniform thickness, the diametric size and internal anatomic character or configuration of the individual sections for a given tuna will vary in accord with the location from which they are derived. In addition, the diametric size of the lateral sections derived from a given tuna will vary in accordance with the size of that particular tuna. FIG. 1 is intended to be a schematic illustration of the general internal character or anatomic configuration of a tuna when it is divided into sections in accordance with the invention. It should be noted from FIG. 1 that the visceral cavity (150) varies in size, depending upon the location within the fish from which the section is derived. Likewise, the blood meat portions (148) vary in cross-sectional configuration depending upon the location from which the section is derived.

Figure 2:
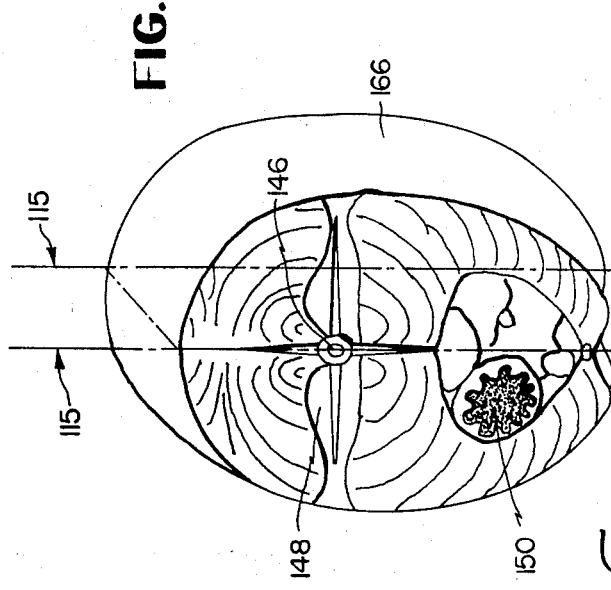
FIG. 2 is a perspective view of an exemplary section; for instance section No. 6 taken at midlength of the fish.

The above-described subdivision of the whole tuna into discrete lateral sections provides segments of tuna, each of which is laterally symmetrical about a dorsal to ventral plane, as represented by lines 115 in FIG. 2, and makes possible the sorting of individual sections obtained from pluralities of tuna into predetermined groupings according to the general internal anatomical characteristics or configurations thereof to markedly facilitate subsequent operations such as evisceration, when required, skinning, removal of the blood meat, skeletal structure, cartilaginous materials and the like. Moreover, when the whole tuna are sorted as to size and species, as mentioned earlier, and the resulting multiples of the whole tuna of the same size and species are then subdivided into transverse sections, the sorting of the sections in accordance with their anatomical configurations automatically effects a dimensional sorting of the sections as well, which markedly facilitates those subsequent processing operations wherein size may be a critical parameter.

Figure 3:
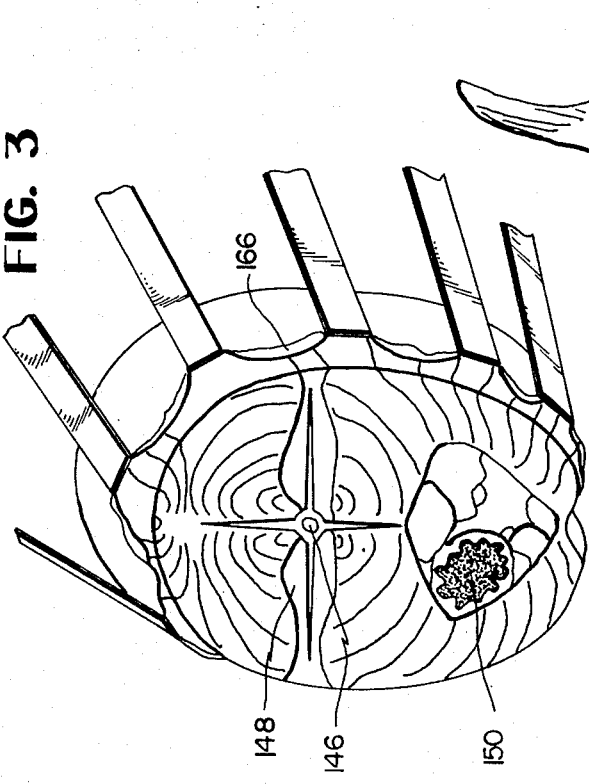
FIG. 3 is a perspective view of the same section showing skin being pulled free of the section.

After the subdivision and sorting operations, the sections are subjected to a thermal treatment wherein the peripheral band of skin (166 in FIG. 2) is caused to at least partially thaw. This thawing returns the skin to its natural pliable condition, which condition, coupled with its inherent toughness in the raw condition, permits it to be grasped and pulled free of the section as shown in FIG. 3.

Subsequent to the skinning operation, or simultaneously therewith, the frozen viscera (150) may be removed by forcing same out through the larger end of the visceral cavity. The removal of the viscera in this manner may be accomplished with the aid of a simple plunger-type punching device, which is configured to conform to the general cross-sectional outline of the visceral cavity at its smaller end.

I have found that in those sections where the cross-sectional areas of the visceral cavity approximates that area which can be covered by the human thumb, that removal of the frozen viscera may be accomplished simply by applying thumb pressure to the small end of the visceral cavity, thereby manually forcing out the frozen viscera through the larger end of the visceral cavity.

With a view toward clarity, it should be pointed out that, due to the inherent longitudinal dissymmetry of the visceral cavity, the contents thereof will usually have a tapered and roughly truncated conical shape, one end of which, depending upon where the section of fish has been taken, is usually larger than the opposing end.

Figure 7:
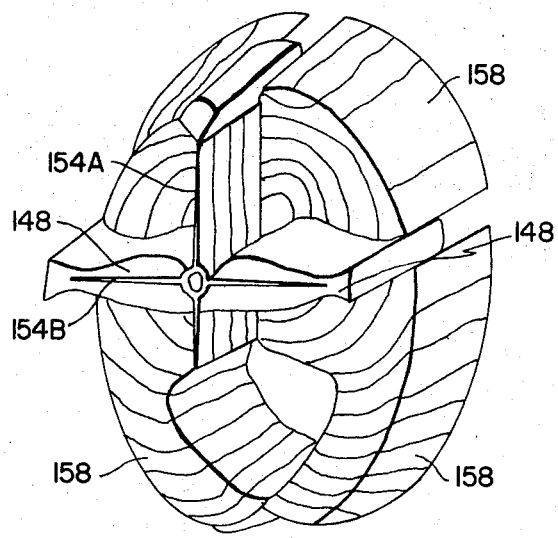
FIG. 7 is a perspective view of the major portions of waste material being partially removed from the section.
Figure 8:
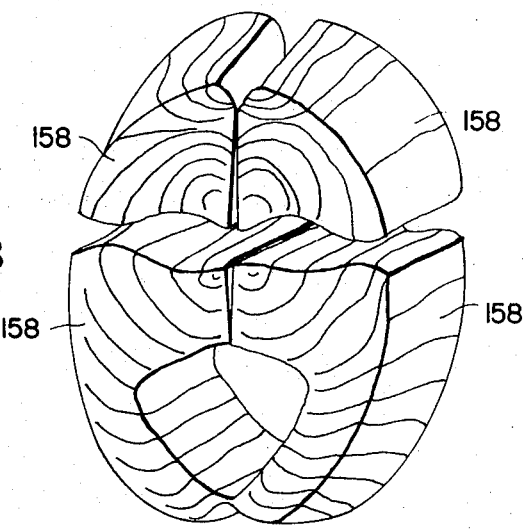
FIG. 8 is a perspective view of the same section substantially free of waste material.
Figure 9:
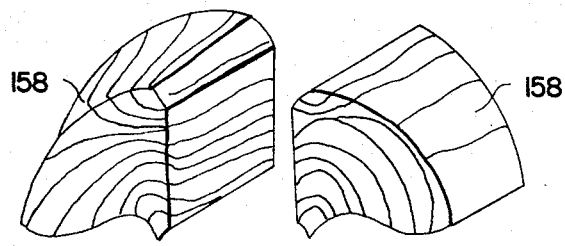
FIG. 9 is an exploded perspective view of the edible portions of the same section.
Figure 9:
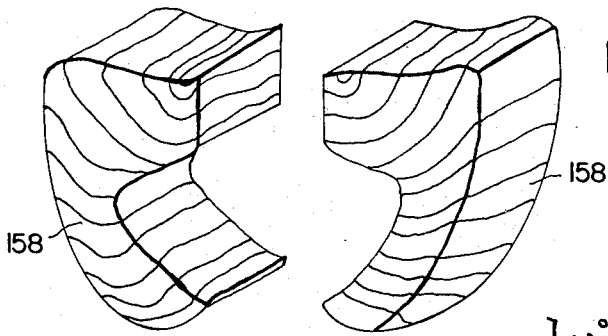

Subsequent to the above-outlined evisceration procedure, the skeletal structure as represented by 154a and 154b in FIG. 7, along with the blood meat portions, as represented by 148 in the same Figure, may be removed from the section by the coring-out of same as schematically shown in FIG. 7. Such an operation is facilitated through the use of cutting dies of "cookie cutter" principle, suitably configured to cleave the section of tuna along pattern lines which generally follow the junctures of the more valuable loin meat, represented by 158 and the aforesaid waste material.

What I claim is:

1. The method of butchering fish which have previously been frozen comprising
   a. subdividing the fish by dividing the loin-bearing portions along planes approximately normal to the major skeletal axis of the fish into a plurality of discrete bilaterally symmetrical frozen sections having predetermined thicknesses,
   b. thereafter skinning said sections, and
   c. operating on said skinned sections to effect separation of the scrap parts of the sections from the loin meat parts while the latter are still in at least a partially frozen condition.

2. The method of butchering fish as claimed in claim 1 further comprising d. subjecting the peripheral areas of the sections to thermal treatment to cause at least a partial thaw prior to performing the step of skinning.

3. The method of butchering fish which have previously been frozen comprising
   a. subdividing the principal loin-bearing portions of the fish while same is still substantially frozen generally transversely to the longitudinal axis thereof to form a plurality of frozen sections, and
   b. thereafter subdividing said frozen sections into loin segments while at least the flesh of same is still at least partially frozen, along lines substantially parallel to the skeletal structure.

4. The method as set forth in claim 3 including the step of removing the skin from the fish in an operation subsequent to the transverse subdivision of same.

5. The method as set forth in claim 3 including the step of removing the viscera from the visceral cavity in an operation subsequent to the transverse subdivision of the fish.

6. The method of claim 1 further comprising the step of grading the first subdivided sections in accordance with their physical characteristics and quality.

7. The method of claim 3 further comprising the step of sorting the second subdivided loin segments in accordance with their physical characteristics.

8. The method of butchering a previously frozen fish carcass comprising
   a. cutting laterally through the frozen carcass to divide the carcass into a number of frozen transverse discrete sections,
   b. removing the frozen viscera from the visceral cavity by punching out the viscera through the larger end of the section of the visceral cavity,
   c. skinning the sections, and
   d. also removing the skeletal structure and frozen blood meat portions leaving the valuable loin meat divested of waste material.

9. The method of butchering fish which have been previously frozen comprising
   a. subdividing the frozen fish into a plurality of frozen transverse sections by making multiple cuts through the fish, said cuts being made approximately at right angles to the backbone of the fish,
   b. removing the viscera from the visceral cavity in an operation subsequent to the subdivision of the fish, and
   c. dividing said frozen sections into segments of loin meat parts and scrap parts by making cuts through the sections, said cuts being made approximately parallel to the back bone of the fish.

10. The method of butchering a previously frozen fish carcass comprising
    a. cutting laterally through the frozen carcass to divide the carcass into a number of frozen transverse discrete sections,
    b. removing the viscera from the visceral cavity of each section by forcing the viscera out of the larger end of the visceral cavity,
    c. skinning the sections, and
    d. also removing the skeletal structure and frozen blood meat portions leaving the valuable loin meat divested of waste material.